US008693690B2

(12) United States Patent
Relyea

(10) Patent No.: US 8,693,690 B2
(45) Date of Patent: Apr. 8, 2014

(54) ORGANIZING AN EXTENSIBLE TABLE FOR STORING CRYPTOGRAPHIC OBJECTS

(75) Inventor: Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1597 days.

(21) Appl. No.: 11/566,640

(22) Filed: Dec. 4, 2006

(65) Prior Publication Data
US 2008/0133514 A1 Jun. 5, 2008

(51) Int. Cl.
H04L 9/08 (2006.01)
G06F 17/30 (2006.01)

(52) U.S. Cl.
USPC .............. 380/277; 380/59; 707/802; 707/803

(58) Field of Classification Search
None
See application file for complete search history.

(56) References Cited

U.S. PATENT DOCUMENTS

| 4,108,367 | A | | 8/1978 | Hannan |
|---|---|---|---|---|
| 4,849,614 | A | | 7/1989 | Watanabe et al. |
| 4,924,330 | A | | 5/1990 | Seamons et al. |
| 5,247,163 | A | | 9/1993 | Ohno et al. |
| 5,355,414 | A | | 10/1994 | Hale et al. |
| 5,499,371 | A | * | 3/1996 | Henninger et al. ............ 717/108 |
| 5,594,227 | A | | 1/1997 | Deo |
| 5,631,961 | A | | 5/1997 | Mills et al. |
| 5,655,077 | A | * | 8/1997 | Jones et al. ........................ 726/8 |
| 5,666,415 | A | | 9/1997 | Kaufman |
| 5,721,781 | A | | 2/1998 | Deo et al. |
| 5,745,576 | A | | 4/1998 | Abraham et al. |
| 5,745,678 | A | | 4/1998 | Herzberg et al. |
| 5,768,373 | A | | 6/1998 | Lohstroh et al. |
| 5,774,551 | A | * | 6/1998 | Wu et al. ........................ 713/155 |
| 5,787,442 | A | * | 7/1998 | Hacherl et al. ........................ 1/1 |
| 5,862,310 | A | | 1/1999 | Crawford et al. |
| 5,878,411 | A | * | 3/1999 | Burroughs et al. ........... 717/106 |
| 5,923,884 | A | | 7/1999 | Peyret et al. |
| 5,937,066 | A | | 8/1999 | Gennaro et al. |
| 5,943,423 | A | | 8/1999 | Muftic |
| 5,991,411 | A | | 11/1999 | Kaufman et al. |
| 5,991,882 | A | | 11/1999 | O'Connell |
| 6,005,942 | A | | 12/1999 | Chan et al. |
| 6,005,945 | A | | 12/1999 | Whitehouse |

(Continued)

FOREIGN PATENT DOCUMENTS

| WO | 9724831 | | 7/1997 |
|---|---|---|---|
| WO | 0046064 | A1 | 8/2000 |
| WO | 2007096590 | A1 | 8/2007 |

OTHER PUBLICATIONS

Balfanz (Dirk ABalfanz, "Access Control for Ad-Hoc Collaboration", Princeton University Jan. 2001).*

(Continued)

Primary Examiner — Peter Poltorak
(74) Attorney, Agent, or Firm — Lowenstein Sandler LLP

(57) ABSTRACT

Embodiments of the present invention provide a method and apparatus, including a client and security token, for managing cryptographic objects, such as public key cryptography standard (PKCS)#11 objects, in a computer system. A storage table for the cryptographic objects is established including rows for the cryptographic objects and columns corresponding to available attributes capable of being associated with the cryptographic objects. Actual attributes of the cryptographic objects are stored in ones of the plurality of columns corresponding to respective ones of the available attributes. The storage table is extensible such that additional columns are added corresponding to new attributes capable of being associated with the cryptographic objects.

22 Claims, 10 Drawing Sheets

(56) References Cited

U.S. PATENT DOCUMENTS

| | | | |
|---|---|---|---|
| 6,011,847 A | 1/2000 | Follendore, III | |
| 6,016,476 A | 1/2000 | Maes et al. | |
| 6,044,155 A | 3/2000 | Thomlinson et al. | |
| 6,072,876 A | 6/2000 | Obata et al. | |
| 6,141,420 A | 10/2000 | Vanstone et al. | |
| 6,178,507 B1 | 1/2001 | Vanstone | |
| 6,179,205 B1 | 1/2001 | Sloan | |
| 6,185,574 B1 * | 2/2001 | Howard et al. | 1/1 |
| 6,219,790 B1 * | 4/2001 | Lloyd et al. | 726/14 |
| 6,226,744 B1 | 5/2001 | Murphy et al. | |
| 6,345,278 B1 * | 2/2002 | Hitchcock et al. | 1/1 |
| 6,377,825 B1 | 4/2002 | Kennedy et al. | |
| 6,411,959 B1 * | 6/2002 | Kelsey | 1/1 |
| 6,490,680 B1 | 12/2002 | Scheidt et al. | |
| 6,502,108 B1 | 12/2002 | Day et al. | |
| 6,539,093 B1 | 3/2003 | Asad et al. | |
| 6,542,895 B1 * | 4/2003 | DeKimpe et al. | 1/1 |
| 6,636,975 B1 | 10/2003 | Khidekel et al. | |
| 6,643,701 B1 | 11/2003 | Aziz et al. | |
| 6,687,190 B2 | 2/2004 | Momich et al. | |
| 6,687,823 B1 * | 2/2004 | Al-Salqan et al. | 713/167 |
| 6,691,137 B1 | 2/2004 | Kishi | |
| 6,698,654 B1 | 3/2004 | Zuppicich | |
| 6,734,886 B1 | 5/2004 | Hagan et al. | |
| 6,760,752 B1 | 7/2004 | Liu et al. | |
| 6,804,687 B2 | 10/2004 | Sampson | |
| 6,819,766 B1 | 11/2004 | Weidong | |
| 6,826,686 B1 | 11/2004 | Peyravian | |
| 6,829,712 B1 | 12/2004 | Madoukh | |
| 6,880,037 B2 | 4/2005 | Boyer | |
| 6,880,084 B1 | 4/2005 | Brittenham et al. | |
| 6,898,605 B2 | 5/2005 | Constantino | |
| 6,898,714 B1 | 5/2005 | Nadalin et al. | |
| 6,931,133 B2 | 8/2005 | Andrews et al. | |
| 6,941,326 B2 | 9/2005 | Kadyk et al. | |
| 6,970,970 B2 | 11/2005 | Jung et al. | |
| 6,978,933 B2 | 12/2005 | Yap et al. | |
| 6,986,040 B1 | 1/2006 | Kramer et al. | |
| 7,007,105 B1 | 2/2006 | Sullivan et al. | |
| 7,010,600 B1 | 3/2006 | Prasad et al. | |
| 7,050,589 B2 | 5/2006 | Kwan | |
| 7,051,213 B1 | 5/2006 | Kobayashi et al. | |
| 7,080,085 B1 * | 7/2006 | Choy et al. | 1/1 |
| 7,085,386 B2 | 8/2006 | Audebert et al. | |
| 7,114,028 B1 | 9/2006 | Green et al. | |
| 7,156,302 B2 | 1/2007 | Yap et al. | |
| 7,159,763 B2 | 1/2007 | Yap et al. | |
| 7,185,018 B2 | 2/2007 | Archbold et al. | |
| 7,251,728 B2 | 7/2007 | Toh et al. | |
| 7,278,581 B2 | 10/2007 | Ong | |
| 7,299,364 B2 | 11/2007 | Noble et al. | |
| 7,302,585 B1 | 11/2007 | Proudler et al. | |
| 7,322,040 B1 * | 1/2008 | Olson et al. | 726/8 |
| 7,356,688 B1 | 4/2008 | Wang | |
| 7,374,099 B2 | 5/2008 | de Jong | |
| 7,386,705 B2 | 6/2008 | Low et al. | |
| 7,437,757 B2 | 10/2008 | Holdsworth | |
| 7,451,921 B2 | 11/2008 | Dowling et al. | |
| 7,475,250 B2 | 1/2009 | Aull et al. | |
| 7,475,256 B2 | 1/2009 | Cook | |
| 7,480,384 B2 | 1/2009 | Peyravian et al. | |
| 7,502,793 B2 | 3/2009 | Snible et al. | |
| 7,571,321 B2 | 8/2009 | Appenzeller et al. | |
| 7,602,910 B2 | 10/2009 | Johansson et al. | |
| 7,702,917 B2 | 4/2010 | Tevosyan et al. | |
| 7,769,996 B2 | 8/2010 | Randle et al. | |
| 7,822,209 B2 | 10/2010 | Fu et al. | |
| 7,860,243 B2 | 12/2010 | Zheng et al. | |
| 2001/0008012 A1 | 7/2001 | Kausik | |
| 2001/0036276 A1 | 11/2001 | Ober et al. | |
| 2001/0054148 A1 | 12/2001 | Hoornaert et al. | |
| 2002/0004816 A1 | 1/2002 | Vange et al. | |
| 2002/0007351 A1 | 1/2002 | Hillegass et al. | |
| 2002/0007359 A1 * | 1/2002 | Nguyen | 707/4 |
| 2002/0010679 A1 | 1/2002 | Felsher | |
| 2002/0029343 A1 | 3/2002 | Kurita | |
| 2002/0056044 A1 | 5/2002 | Andersson | |
| 2002/0059144 A1 | 5/2002 | Meffert et al. | |
| 2002/0064095 A1 | 5/2002 | Momich et al. | |
| 2002/0080958 A1 | 6/2002 | Ober et al. | |
| 2002/0099727 A1 | 7/2002 | Kadyk et al. | |
| 2002/0112156 A1 | 8/2002 | Gien et al. | |
| 2002/0120842 A1 * | 8/2002 | Bragstad et al. | 713/156 |
| 2002/0133707 A1 | 9/2002 | Newcombe | |
| 2002/0171546 A1 | 11/2002 | Evans et al. | |
| 2002/0184149 A1 | 12/2002 | Jones | |
| 2002/0188848 A1 | 12/2002 | Buttiker | |
| 2003/0005291 A1 | 1/2003 | Burn | |
| 2003/0012386 A1 | 1/2003 | Kim et al. | |
| 2003/0028664 A1 | 2/2003 | Tan et al. | |
| 2003/0035548 A1 | 2/2003 | Kwan | |
| 2003/0056099 A1 | 3/2003 | Asanoma et al. | |
| 2003/0075610 A1 | 4/2003 | Ong | |
| 2003/0093695 A1 | 5/2003 | Dutta | |
| 2003/0115455 A1 | 6/2003 | Aull et al. | |
| 2003/0115466 A1 | 6/2003 | Aull et al. | |
| 2003/0115467 A1 | 6/2003 | Aull et al. | |
| 2003/0115468 A1 | 6/2003 | Aull et al. | |
| 2003/0167399 A1 | 9/2003 | Audebert et al. | |
| 2003/0172034 A1 | 9/2003 | Schneck et al. | |
| 2004/0042620 A1 | 3/2004 | Andrews et al. | |
| 2004/0053642 A1 | 3/2004 | Sandberg et al. | |
| 2004/0066274 A1 | 4/2004 | Bailey | |
| 2004/0088562 A1 | 5/2004 | Vassilev et al. | |
| 2004/0096055 A1 | 5/2004 | Williams et al. | |
| 2004/0103324 A1 | 5/2004 | Band | |
| 2004/0103325 A1 | 5/2004 | Priebatsch | |
| 2004/0120525 A1 | 6/2004 | Miskimmin et al. | |
| 2004/0144840 A1 | 7/2004 | Lee et al. | |
| 2004/0146163 A1 | 7/2004 | Asokan et al. | |
| 2004/0153451 A1 | 8/2004 | Phillips et al. | |
| 2004/0162786 A1 | 8/2004 | Cross et al. | |
| 2004/0230831 A1 | 11/2004 | Spelman et al. | |
| 2005/0022123 A1 | 1/2005 | Costantino | |
| 2005/0033703 A1 | 2/2005 | Holdsworth | |
| 2005/0109841 A1 | 5/2005 | Ryan et al. | |
| 2005/0114673 A1 | 5/2005 | Raikar et al. | |
| 2005/0119978 A1 | 6/2005 | Ates | |
| 2005/0123142 A1 | 6/2005 | Freeman et al. | |
| 2005/0138386 A1 | 6/2005 | Le Saint | |
| 2005/0138390 A1 | 6/2005 | Adams et al. | |
| 2005/0144312 A1 | 6/2005 | Kadyk et al. | |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188360 A1 | 8/2005 | de Jong | |
| 2005/0216732 A1 | 9/2005 | Kipnis et al. | |
| 2005/0262361 A1 | 11/2005 | Thibadeau | |
| 2005/0279827 A1 | 12/2005 | Mascavage et al. | |
| 2005/0289652 A1 | 12/2005 | Sharma et al. | |
| 2006/0005028 A1 | 1/2006 | Labaton | |
| 2006/0010123 A1 | 1/2006 | Liu et al. | |
| 2006/0015933 A1 | 1/2006 | Ballinger et al. | |
| 2006/0036868 A1 | 2/2006 | Cicchitto | |
| 2006/0043164 A1 | 3/2006 | Dowling et al. | |
| 2006/0072747 A1 | 4/2006 | Wood et al. | |
| 2006/0073812 A1 | 4/2006 | Punaganti Venkata et al. | |
| 2006/0075133 A1 | 4/2006 | Kakivaya et al. | |
| 2006/0075486 A1 | 4/2006 | Lin et al. | |
| 2006/0101111 A1 | 5/2006 | Bouse et al. | |
| 2006/0101506 A1 | 5/2006 | Gallo et al. | |
| 2006/0173848 A1 | 8/2006 | Peterson et al. | |
| 2006/0174104 A1 | 8/2006 | Crichton et al. | |
| 2006/0206932 A1 | 9/2006 | Chong | |
| 2006/0208066 A1 | 9/2006 | Finn et al. | |
| 2006/0226243 A1 | 10/2006 | Dariel | |
| 2006/0291664 A1 | 12/2006 | Suarez et al. | |
| 2006/0294583 A1 | 12/2006 | Cowburn et al. | |
| 2007/0014416 A1 | 1/2007 | Rivera et al. | |
| 2007/0074034 A1 | 3/2007 | Adams et al. | |
| 2007/0112721 A1 | 5/2007 | Archbold et al. | |
| 2007/0113267 A1 | 5/2007 | Iwanski et al. | |
| 2007/0113271 A1 | 5/2007 | Pleunis | |
| 2007/0118891 A1 | 5/2007 | Buer | |

(56) References Cited

U.S. PATENT DOCUMENTS

| | | |
|---|---|---|
| 2007/0162967 A1 | 7/2007 | de Jong et al. |
| 2007/0169084 A1 | 7/2007 | Frank et al. |
| 2007/0189534 A1 | 8/2007 | Wood et al. |
| 2007/0204333 A1 | 8/2007 | Lear et al. |
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1* | 3/2008 | Leach et al. ............ 713/189 |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

OTHER PUBLICATIONS

Greenspan (Jay Greenspan, "Your First Database", found at http://webmonkey.com/webmonkey/99/13/index0a.html, Sep. 2006 version).*

ATM and Credit Card Notification, Feb. 2005 (internet archive) pp. 1-2 www.thereareplaces.com/infgdes/money.atmnotif.htm.

AMD Announces Specification for Open Platform Management Architecture, Feb. 28, 2005, pp. 1-2 http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Secure Code in C", 1996, John Wiley & Sons, Inc., Second Edition, pp. 455-456.

Zuccherato, Robert, Elliptic Curve Cryptography Support in Entrust, May 9, 2000.

PKCS# v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Schneier, Bruce. Applied Cryptography, Second Edition. 1996 John Wiley and Sons, pp. 480-481.

* cited by examiner

ORGANIZING AN EXTENSIBLE TABLE FOR STORING CRYPTOGRAPHIC OBJECTS

DESCRIPTION OF THE INVENTION

1. Field of the Invention

The present invention relates generally to security in a complex heterogeneous multi-user computer environment and, more particularly, to organizing a storage table for storing cryptographic objects by attribute.

2. Background of the Invention

In complex computer systems such as those deployed in many business enterprises, security is an obvious concern. Factors requiring serious consideration in connection with the security environment include mobility, the geographic and physical architecture of the system, and the multi-user nature of the systems. In light of the many factors, tokens have become an acceptable way to ensure that users can connect to the system from any convenient work station, even a home-based or remote Internet based terminal in a secure manner.

In computer network environments, security systems based on PKI are gaining popularity as a way of providing security or enhancing existing security, particularly with regard to security for network connections. Generally speaking, a PKI is an arrangement of servers, clients, and specific information that passes between them, for the verification of user identities by one or more trusted third parties such as, for example, one or more Certification Authorities (CA). The specific information is referred to as a public key and is typically associated with or bound to a particular user or users.

The establishment of a public key is typically accomplished by security or PKI software executing at a central location, such as a server, and operating in a coordinated or sometimes uncoordinated fashion with software at client locations. The public keys are typically provided within security certificates specified under, for example, the PKI Working Group (PKIX) of the Internet Engineering Task Force (IETF), which implement certificate standards based on the International Telecommunication Union—Telecommunication Standardization Sector (ITU-T) Recommendation X.509 ITU-T Recommendation X.509 (1997 E): Information Technology—Open Systems Interconnection—The Directory: Authentication Framework, June 1997 also specified in Comité Consultatif International Téléphonique et Télégraphique (CCITT), Geneva, 1989, Data Communication Networks: Directory, Recommendation X.500-X.521, Blue Book, Volume VIII-Fascicle VIII.8 and International Standards Organization/International Engineering Consortium (ISO/IEC), 25 Dec. 1991, Information Technology—Open Systems Interconnection—The Directory: Authentication Framework, ISO/IEC 9594-8 (CCITT Recommendation X.509). The PKIX further specifies additional aspects in connection with request for comments (RFC) 3280, Housley, R., et al., "Internet X.509 Public Key Infrastructure: Certificate and Certificate Revocation List (CRL) Profile", RFC 3280, April 2002 (supersedes RFC 2459).

Using a PKI, network communications between, for example, a server and a client can be protected such as with a secure socket layer (SSL) connection between the server and client. Originally, SSL was privately developed as a way to provide a secure connection between an Internet web server and a browser operating on a client and has now been adopted as an open security standard by IETF. To operate in a PKI environment, a server wishing to communicate with a client or other network nodes needs to obtain a certificate for validating its identity to the client or other nodes and for allowing an encryption key to be generated for the establishment of the SSL connection. When the client and server first make a connection, the certificate is received by the client and the issuing CA is compared with a root CA certificate stored locally on the client. If the root CA matches the issuing CA then the certificate can be considered trusted. Otherwise a notification can be provided to the client that additional verification steps should be taken to ensure that the server can be "trusted."

A typical certificate contains the name of the server or other entity that is being identified, the server's public key, the name of the issuing CA, and other information including validity dates and cryptographic information proving that the certificate is authentic, and the serial number of the certificate. When an owner of a token is issued a certificate, the certificate and information associated with the certificate are typically stored in a data structure in a memory area of the token. The information generally would include a public key and a private key identifier or the like that would enable the derivation of a private key allowing content encrypted using the private key to be decrypted. In a scenario, for example, where a token owner wishes to connect to a computer system from a client, the token owner can insert the token into a token interface, and, after entering a password or other means of authentication can connect to a system server. If the user wishes to view an encrypted object, such as an email message of which the user is a recipient, the system can search for the private key in order to decrypt the content as specified for example in connection with the secure multi-purpose mail extension (S/MIME) specification as outlined in RFC 2311, "S/MIME Version 2 Message Specification" Dusse, et al., March 1998 or variants thereof. In practice, the private keys associated with S/MIME can be arbitrarily long and in addition a two-step procedure is generally required to access the private key stored in the token. For example, the server can look at the certificate to obtain a public key for the recipient and then the public key can be used to index into a data structure or storage structure located on the token to obtain the private key. The private key can then be used to decrypt the message.

In a typical security scenario, an application, which requires a cryptographic object that is associated with a particular cryptographic standard, such as public key cryptography standard (PKCS), will construct a request for the object through a cryptography module executing in connection with an operating system or may access the object through a call constructed in accordance with an application programming interface (API) or the like supplied in a library from the operating system, operating system manufacturer or a third party. Storage for and access to cryptographic objects can be provided while complying with the cryptographic standard. A proprietary interface to hardware components such as storage devices including tokens, smart cards or the like can be constructed to access objects. Objects are typically organized in a storage device in a manner to best facilitate access to the object, for example, by object name. Further, depending on the type of access calls provided by the API, the proprietary interface may require time-intensive access through a number of calls designed to accommodate the different formats. Such access may require inordinate amount of time and large and increasing amounts of code to support a growing list of different standards. As standards change, code definitions can change requiring modifications to the code, presenting logistical problems.

Difficulties can arise however, when changes occur to the cryptographic standard, such as by adding new attributes in a PKCS#11 implementation. In a proprietary system, new definitions must be established and code builds may potentially require re-compilation to activate the new definitions. Further complicating the problem for government applications, various standards such as federal information processing standard (FIPS), as specified for example in FIPS PUB 140-2, entitled "SECURITY REQUIREMENTS FOR CRYPTOGRAPHIC MODULES," National Institute of Standards and Technology (NIST), May 25, 2001, (revised Dec. 3, 2002), requires periodic audits under Cryptographic Module Validation Program (CMVP) to ensure compliance.

Therefore, if aspects of the organization of storage device changes, compliance issues, including FIPS compliance issues for government systems, may further complicate code management and validation. It would be desirable to provide a capability to store, retrieve and perform standards-based operations on cryptographic objects, in a manner that would reduce the requirements for code maintenance and code size while increasing storage access speed and organizational efficiency of the storage device.

While a background including problems in the art are described hereinabove, with reference to related art or concepts associated with the present invention, the description is not intended to be limiting since the features of the present invention are set forth in the description which follows. Aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Figure 1:
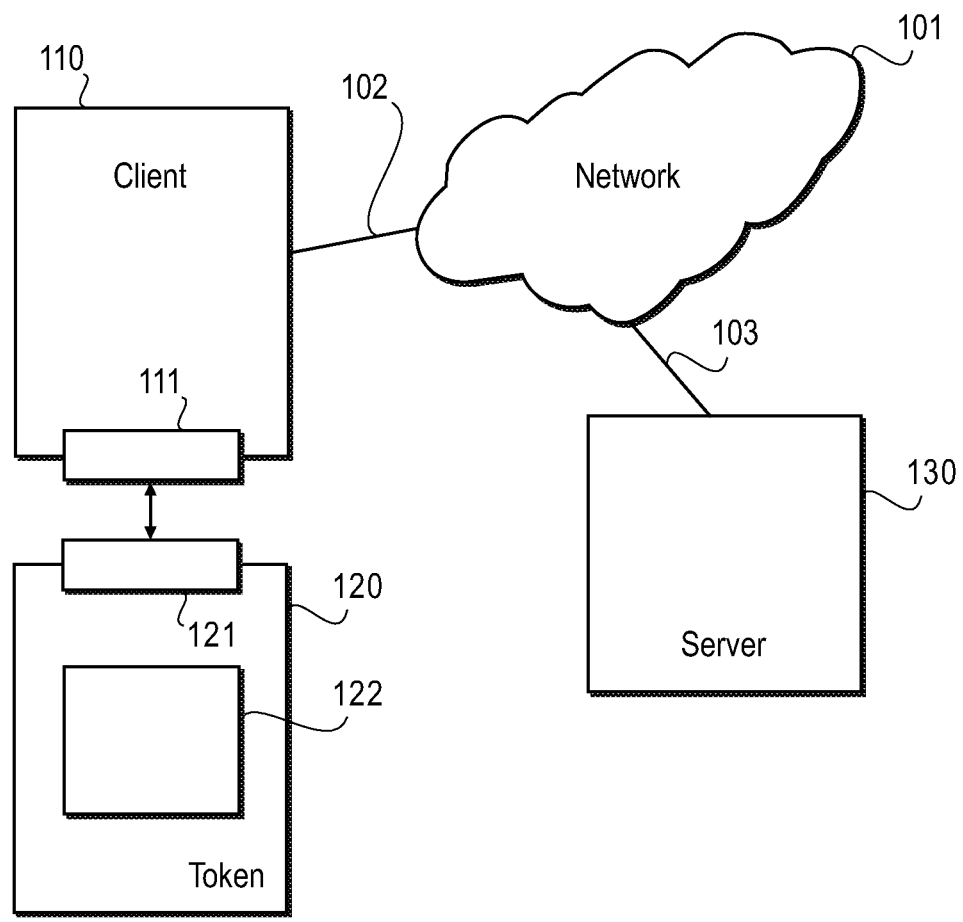
FIG. 1 is a diagram illustrating exemplary components of a computer system consistent with embodiments of the present invention.

Embodiments of the present invention provide a method and apparatus for managing cryptographic objects in a computer system. In accordance, for example, with procedures of an exemplary method a storage table is established for the cryptographic objects, such as public key cryptographic standard (PKCS) #11 objects. The storage table includes rows corresponding to respective ones of the cryptographic objects and a plurality of columns associated with the rows. The columns correspond to available attributes capable of being associated with any of the cryptographic objects. Actual attributes of the cryptographic objects are stored in ones of the plurality of columns that correspond to respective ones of the available attributes. If a cryptographic object does not have one of the available attributes, then the column for that attribute will not have a value stored therein, or will have a null value or some other indicator that no actual attribute for the available attribute represented by the column is present for that particular object.

It should be noted that the storage table is extensible such that additional columns are added corresponding to new attributes capable of being associated with the cryptographic objects. The storage table is searched for one or more of the cryptographic objects based on one or more of the available attributes. The cryptographic objects having actual attributes corresponding to the available attributes used in the searching can thereby be located. In accordance with various embodiments, the available attributes include PKCS attributes, such as PKCS#11 attributes, and user-defined attributes such as a pathname of the cryptographic objects, a provider name of the cryptographic objects, a method of the provider of the cryptographic objects whether enabled or disabled. The storage table includes a standard query language (SQL) database table.

In accordance with other embodiments, a cryptography module can be provided in a computer having an operating system capable of facilitating the execution of an application requiring a cryptographic object, such as a web browser, a cryptography application, an email client, or the like. The application can request the cryptographic object using a security library made accessible through the operating system, such as by providing an application programming interface (API) or the like. The cryptography module can be configured to include a storage table capable of storing a plurality of cryptographic objects, such as PKCS#11 objects, each having at least a portion of a set of available attributes. The storage table is accessible using a standard query language (SQL) and is organized such that a row is allocated to the each of the plurality of cryptographic objects and a column is allocated to each of the available attributes, whether or not a particular object possesses all of the available attributes. The storage table is further organized to be capable of adding a new column corresponding to a new attribute associated with all of the plurality of cryptographic objects, and can be stored, for example, in a token such as a smart card, universal serial bus (USB) token or the like.

A translator can be used to translate a first command associated with one of the plurality of cryptographic objects into a second command and can be configured to be compliant with a government standard including a federal information processing standard (FIPS). The first command can be constructed in accordance with a cryptography standard such as PKCS #11 and the second command can be constructed in accordance with SQL. In constructing the first and the second commands, at least one of the available attributes can be used. The first command can include, for example, one of several standard commands, such as PKCS#11 commands, including a CREATE_OBJECT command, a COPY_OBJECT command, a DELETE_OBJECT command, a FIND_OBJECT command, a GET_ATTRIB_VALUE command, and a SET_ATTRIBUTE_VALUE command.

In another embodiment, a client is provided in a computer system. The client can execute an application requiring a cryptographic object, such as a web browser, a cryptography application, an email client or the like. The application can request the cryptographic object using a request constructed from a security library accessible through an operating system associated with the client. The client can include a token interface for connecting to a token, a system interface coupled to the computer system, and a processor coupled to the token interface and the system interface through a conventional connection mechanism such as a data bus or the like. The processor can be configured to organize a storage table for storage in the token. The storage table can store a cryptographic object having at least a portion of a set of available attributes associated with a cryptographic standard, such as PKCS #11. The storage table is accessible using a standard query language (SQL) and is organized such that a row is allocated to the cryptographic object and a column is allocated to each of the available attributes whether or not a particular object possesses that attribute. A request from the security library for the cryptographic object can be translated to a SQL request for the cryptographic object using at least one attribute of the portion of the set of available attributes.

The processor can further organize the storage table to add an additional column allocated to a new attribute associated with either the cryptographic standard, a revised version of the cryptographic standard, and a new cryptographic standard or a common user-defined attribute.

Reference will now be made in detail to exemplary embodiments of the invention, which are illustrated in the accompanying drawings. Wherever possible, the same reference numbers will be used throughout the drawings to refer to the same or like parts.

Referring now to FIG. 1, a simplified and representative environment 100 associated with a multi-user computer system accessed using a token will be discussed and described. The basic representative environment includes a client 110, a network 101, a server 130 and a token 120. The client 110, and the server 130 can be connected to each other through the network 101 through connections 102 and 103 respectively, which can be any one of a number of different types of wired or wireless connections as would be appreciated in the art. It will be appreciated that in an enterprise environment, the client 110 and the server 130 can also be coupled more directly through an intra-net or the like. The client 110 can be connected to the token 120 through an interface 111 which can be a connector such as a universal serial bus (USB) connector, edge connector, or some other connection mechanism. The interface 111 also includes any necessary processing capability or the like such that protocols associated with the low level transfer and exchange of information can be successfully conducted. The token 120 can also include an interface 121 to conduct similar physical and electronic interfacing with the client 110. The token 120 includes a memory area 122 where information such as cryptographic objects, and other information such as small applications can be stored.

Figure 2:
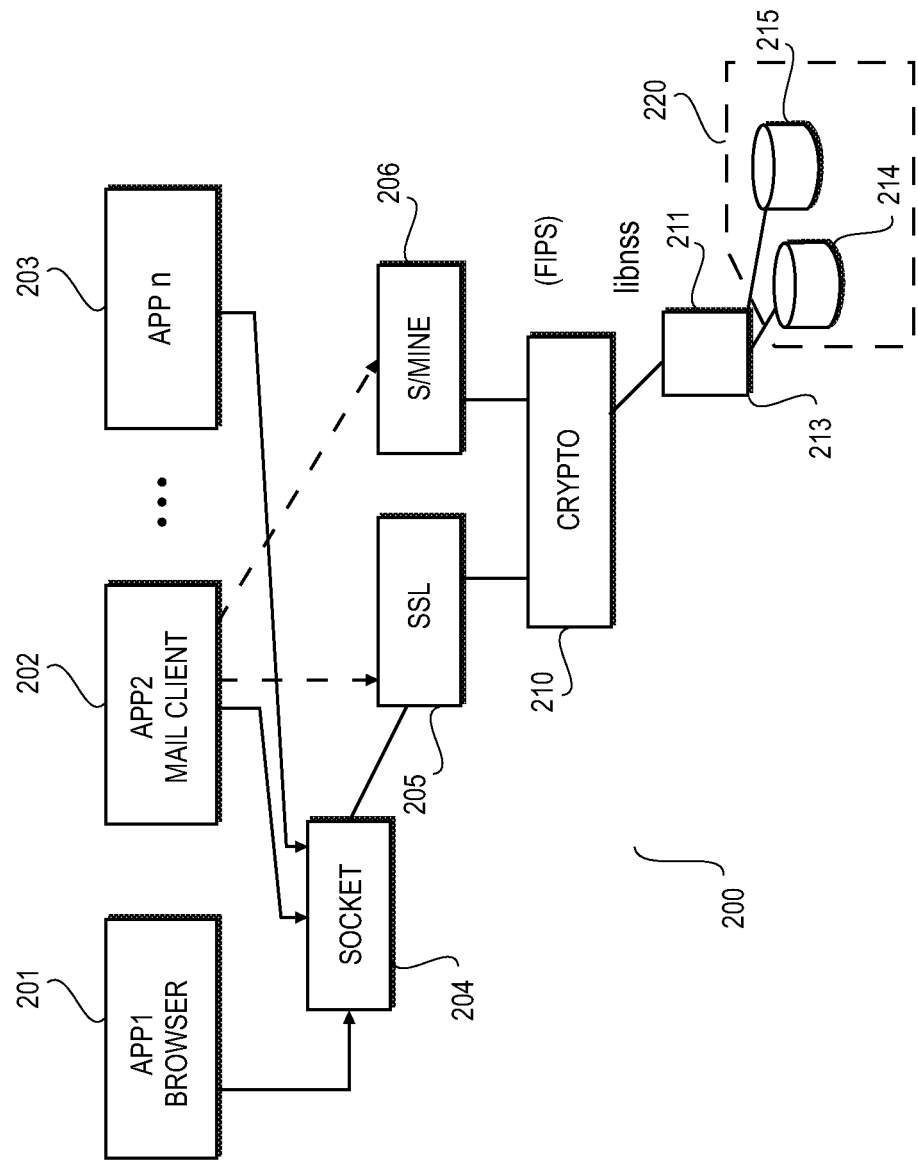
FIG. 2 is a diagram illustrating exemplary software components and hardware components consistent with embodiments of the present invention.

To better appreciate the present invention, an exemplary security scenario 200 is shown in FIG. 2. At a top level, several applications, such as APP1 201, which can be, for example, a web browser, APP2 202, which can be, for example, an email client, and APPN 203. Each of the applications APP1 201, APP2 202 and APPN 203 are typically coupled to the external environment such as a network or the like, and can be coupled to the coupled to a socket 204 for controlling access to communication resources and the like. The socket connection can be protected using modules such as secure sockets layer (SSL) module 205, for example, for browser security, a secure multi-purpose internet mail extension (S/MIME) module 206 for example for email security and the like. One or more of the applications APP1 201, APP2 202 and APPN 203, can be executing on a computer such as a client or the like, and can require a cryptographic object, such as the email client associated with APP2 202, which requires a key to decrypt an email.

The control of access to security-related cryptographic objects typically falls to a cryptography or "crypto" module 210. The crypto module 210 can be used to provide libraries of calls to objects that can be stored, for example, in a token 220 in connection with a token interface module 211. The token 220 can be used to store cryptographic objects such as keys in a key store 214 and certificates in a certificate store 215. When a requirement for a cryptographic object arises in one of the applications APP1 201-APPN 203, access to the object can be provided through a series of calls to the crypto module 210 and the token interface module 211 to retrieve the objects or to perform other object related operations.

Figure 3A:
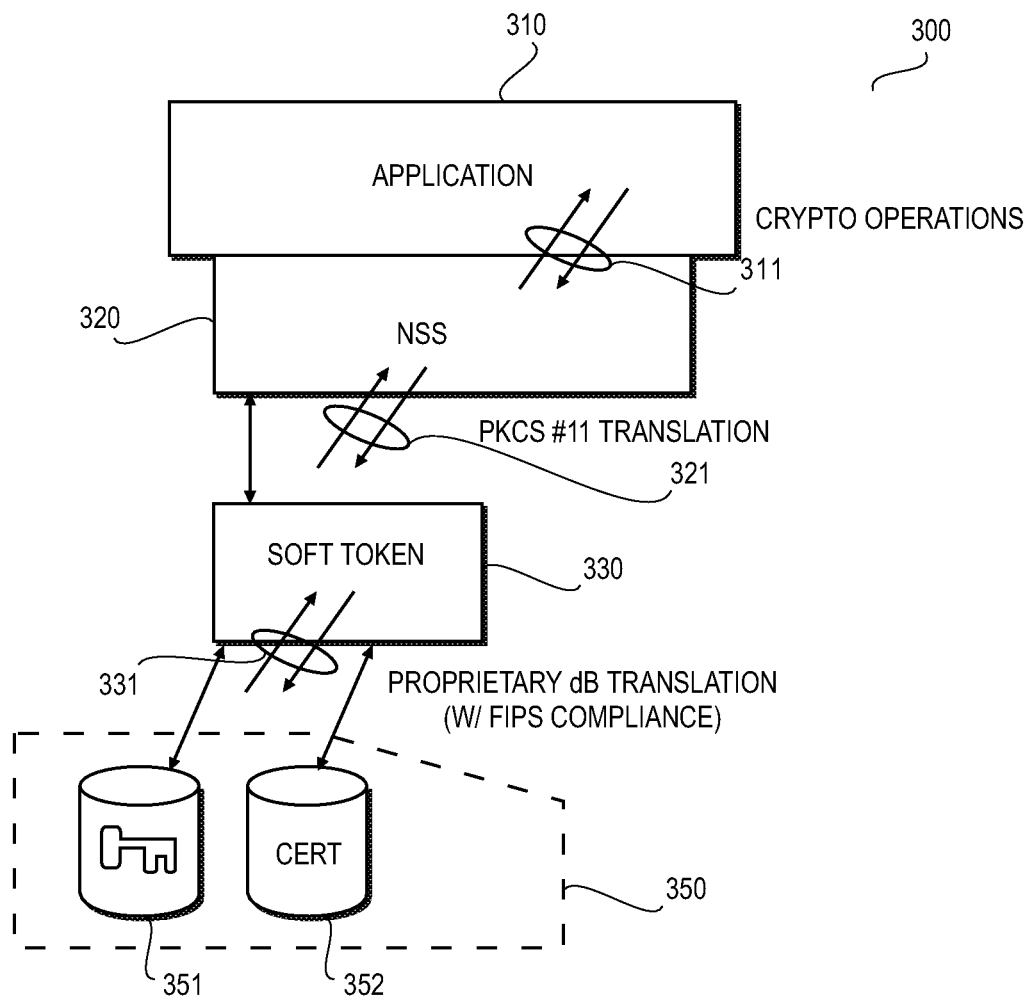
FIG. 3A is a diagram illustrating components including a cryptographic module and token storage structure for storing cryptographic objects organized in a proprietary storage table consistent with embodiments of the present invention.

To better understand the exchange of calls to retrieve objects or to perform other object related operations in connection with a security scenario 300, a diagram including message exchange is shown in FIG. 3A. An application 310, such as described in connection with APP1 201-APPN 203, can generate a cryptographic operation request 311, which is preferably in compliance with a standard such as the PKCS #11 standard. The request 311 can be transferred to a crypto module such as network security services (NSS) module 320. It will be appreciated that NSS module 320 includes a set of libraries for supporting security-enabled client and server applications. Applications APP1 201-APPN 203, which are built with access to NSS can support cryptographic object operation compliant with a number of standards including secure sockets layer (SSL) versions 2 and 3, PKCS #5, PKCS #7, PKCS #11, PKCS #12, S/MIME, X.509 and other security standards. To ensure wide availability, the NSS libraries are widely available through public license. In accordance with some embodiments, a token interface module 330 is included to receive, for example, the PKCS#11 cryptographic operation requests 321 and translate them into a proprietary database operation 331, for access to a token 350 and the repositories for the cryptographic objects such as a key store 351 and a certificate store 352. The operation requests 321 will generally be of a form specified in one or a series of application program interfaces (APIs). The operation requests 321 can be used to conduct cryptographic operations and involve, for example, retrieving, creating, setting, attribute-value pairs associated with cryptographic objects. Examples of operations that can be performed in connection with cryptography APIs along with various attribute value pairs can be found in the Java™ PKCS#11 Reference Guide, (http://java.sun.com/j2se/1.5.0/docs/guide/security/p11guide.html#Intro) revised May 11, 2004. The following excerpt from the PKCS#11 Reference Guide shows exemplary attributes, associated values and attendant descriptions.

TABLE 1

PKCS#11 Attribute-Value pairs

| Attribute | Value | Description |
|---|---|---|
| library | pathname of PKCS#11 implementation | This is the full pathname (including extension) of the PKCS#11 implementation; the format of the pathname is platform dependent. For example, /opt/foo/lib/libpkcs11.so might be the pathname of a PKCS#11 implementation on Solaris and Linux while C:\foo\mypkcs11.dll might be one on Windows. |
| name | name suffix of this provider instance | This string is concatenated with the prefix SunPKCS11 - to produce this provider instance's name (that is, the the string returned by its Provider.getName ( ) method). For example, if the name attribute is "FooAccelerator", then the provider instance's name will be "SunPKCS11-FooAccelerator". |
| description | description of this provider instance | This string will be returned by the provider instance's Provider.getInfo ( ) method. If none is specified, a default description will be returned. |
| slot | slot id | This is the id of the slot that this provider instance is to be associated with. For example, you would use 1 for the slot with the id 1 under PKCS#11. At most one of slot or slotListIndex may be specified. If neither is specified, the default is a slotListIndex of 0. |
| slotListIndex | slot index | This is the slot index that this provider instance is to be associated with. It is the index into the list of all slots returned by the PKCS#11 function C_GetSlotList. For example, 0 indicates the first slot in the list. At most one of slot or slotListIndex may be specified. If neither is specified, the default is a slotListIndex of 0. |
| enabledMechanisms | brace enclosed, whitespace-separated list of PKCS#11 mechanisms to enable | This is the list PKCS#11 mechanisms that this provider instance should use, provided that they are supported by both the Sun PKCS#11 provider and PKCS#11 token. All other mechanisms will be ignored. Each entry in the list is the name of a PKCS#11 mechanism. Here is an example that lists two PKCS#11 mechanisms.<br>enabledMechanisms = {<br>  CKM_RSA_PKCS<br>  CKM_RSA_PKCS_KEY_PAIR_GEN<br>}<br>At most one of enabledMechanisms or disabledMechanisms may be specified. If neither is specified, the mechanisms enabled are those that are supported by both the Sun PKCS#11 provider and the PKCS#11 token. |
| disabledMechanisms | brace enclosed, whitespace-separated list of PKCS#11 mechanisms to disable | This is the list of PKCS#11 mechanism that this provider instance should ignored. Any mechanism listed will be ignored by the provider, even if they are supported by the token and the Sun PKCS#11 provider. At most one of enabledMechanisms or disabledMechanisms may be specified. If neither is specified, the mechanisms enabled are those that are supported by both the Sun PKCS#11 provider and the PKCS#11 token. |
| attributes | see below | The attributes option can be used to specify additional PKCS#11 that should be set when creating PKCS#11 key objects. This makes it possible to accommodate tokens that require particular attributes. For details, see the section below. |

The final entry in Table 1 or the "attributes" entry allows additional PKCS#11 attributes to be defined. Such attributes are set when creating PKCS#11 cryptographic objects. Generally the API provider only specifies mandatory PKCS#11 attributes when creating objects giving rise to the advantages provided by the present invention. For example, for RSA public keys the key type and algorithm (CKA_CLASS and CKA_KEY_TYPE) are specified as well as the key values for RSA public keys (CKA_MODULUS and CKA_PUBLIC_EXPONENT). The particular PKCS#11 library will assign implementation specific default values to the other attributes of an RSA public key, for example values that specify that the key can be used to encrypt and verify messages (CKA_ENCRYPT and CKA_VERIFY=true).

The "attributes" option can be used to override the default values of the particular PKCS#11 implementation. Alternatively, attributes option can be used if the particular PKCS#11 implementation does not support defaults and requires a value to be specified explicitly. It is important to note that specifying invalid attributes or attributes not supported by a particular PKCS#11 implementation may cause the operation to fail at runtime.

The "attributes" option can be specified zero or more times in a particular configuration and the attribute options are processed in the order specified in for example as described below. The attributes option has the format:

```
attributes(operation, keytype, keyalgorithm) = {
    name1 = value1
    [...]
}
```

Valid values for <operation> include: "generate," for keys generated via a KeyPairGenerator or KeyGenerator; "import," for keys created via a KeyFactory or SecretKeyFactory. The noted values also apply to Java software keys automatically converted to PKCS#11 key objects when they are passed to the initialization method of a cryptographic operation, for example Signature.initSign( ),*, for keys created using either a generate or a create operation. Valid values for <keytype> include CKO_PUBLIC_KEY, CKO_PRIVATE_KEY, and CKO_SECRET_KEY for public, private, and secret keys, respectively, and * to match any type of key. Valid values for <keyalgorithm> include one of the CKK_xxx constants from the PKCS#11 specification, or * to match keys of any algorithm. Algorithms supported by, for example, the SunPKCS11 provider include CKK_RSA, CKK_DSA, CKK_DH, CKK_AES, CKK_DES, CKK_DES3, CKK_RC4, CKK_BLOWFISH, and CKK_GENERIC.

It will be appreciated that the attribute names and values are specified as a list of one or more name-value pairs where <name> must be a CKA_xxx constant from the PKCS#11 specification, for example CKA_SENSITIVE.value can be one of the following: a boolean logical value, such as true or false; an integer, in decimal form (default) or in hexadecimal form; null indicating that the corresponding attribute should not be specified when creating objects. Further, if the "attributes" option is specified multiple times, the entries are processed in the order specified. The attributes can be aggregated and later specified attributes will override earlier specified ones. For example, consider the following configuration file excerpt:

```
attributes(*,CKO_PRIVATE_KEY,*) = {
    CKA_SIGN = true }
attributes(*,CKO_PRIVATE_KEY,CKK_DH) = {
    CKA_SIGN = null }
attributes(*,CKO_PRIVATE_KEY,CKK_RSA) = {
    CKA_DECRYPT = true }
```

In the above excerpt, the first entry specifies CKA_SIGN=true for all private keys. The second entry overrides the first with a null specifier for Diffie-Hellman private keys, such that the CKA_SIGN attribute will clearly not be specified for all keys. Finally, the third entry specifies CKA_DECRYPT=true for RSA private keys meaning that RSA private keys will have both CKA_SIGN=true and CKA_DECRYPT=true set.

It will be appreciated that a special form of the "attributes" option specified as attributes=compatibility in the configuration file. The special form represents a set of attribute statements designed to provide maximum compatibility with, for example, existing Java applications. In such a scenario, all key components would be accessible and secret keys useable for both encryption and decryption. The "compatibility" attributes value can be used together with other attributes lines, in which case the same aggregation and overriding rules apply as described earlier.

In some instances, in order to provide services to government clients, compliance to standards such as the FIPS standard described herein above, the storage of objects must be in compliance with FIPS and must be audited. Problems arise however in that as cryptographic standards evolve and change, changes to the proprietary database operations 331 will be required and thus changes to a multitude of definition files and the like. It will be appreciated that auditing the corresponding proprietary software to demonstrate compliance will pose additional difficulties.

Figure 3B:
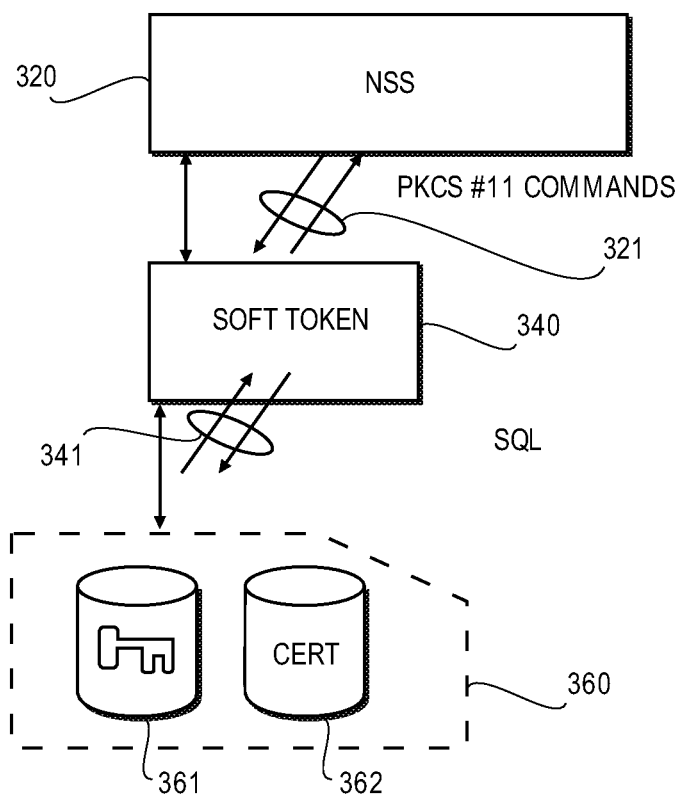
FIG. 3B is a diagram illustrating an exemplary one-stage procedure for indexing into a storage structure to access a private key using identification information consistent with embodiments of the present invention.

To better provide the ability to rapidly search an object database in the face of rapidly evolving security environment is shown in FIG. 3B. Therein, the NSS module 320 can generate the PKCS#11 cryptographic operation requests 321 as described above, and pass them to an alternative token management module 340, where requests using a standard query language (SQL) or an abbreviated version thereof such as SQLite, which is in the public domain, can be used to form SQL queries 341 to the cryptographic objects stored in stores 361 and 362 on the token 360.

Figure 4A:
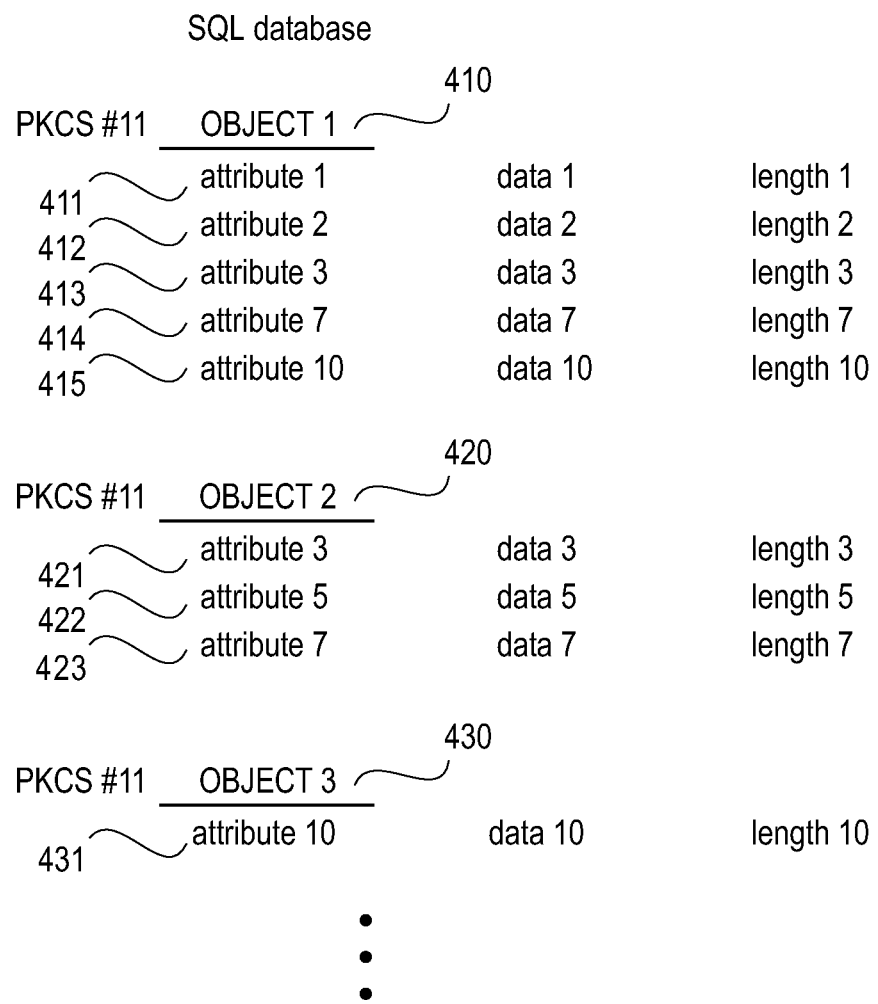
FIG. 4A is a diagram illustrating the organization of cryptographic objects stored in a standard query language (SQL) database.
Figure 4B:
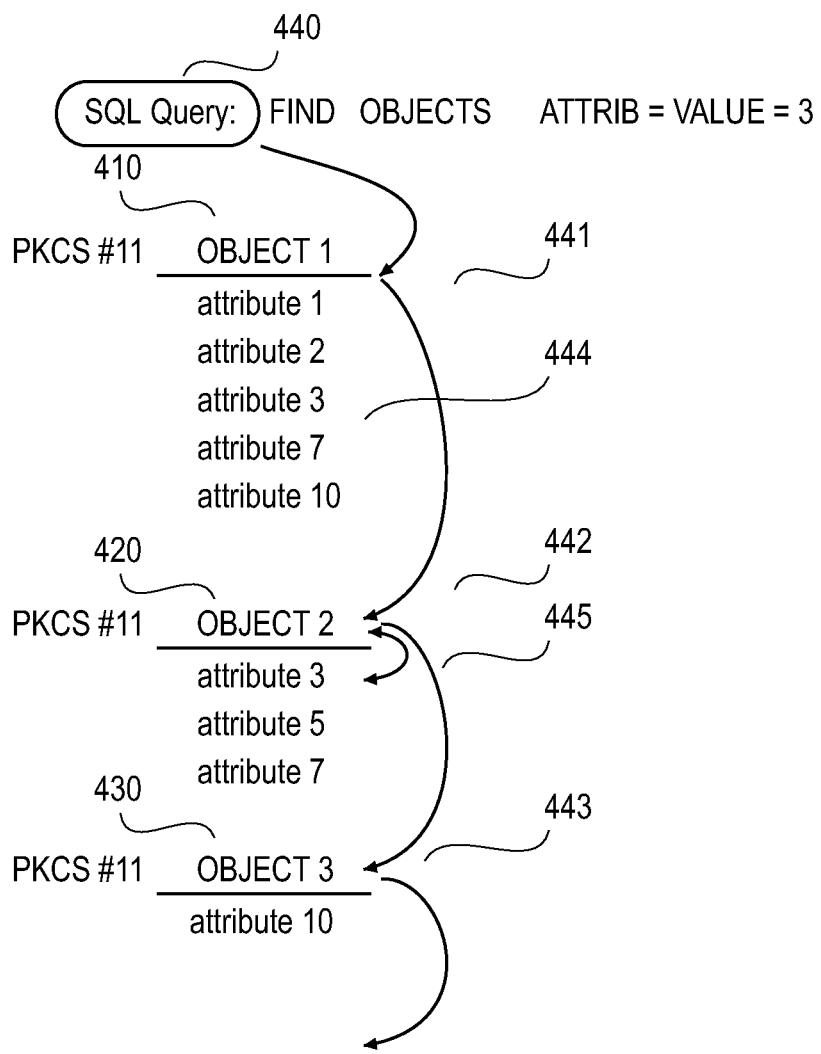
FIG. 4B is a diagram illustrating a search of cryptographic objects stored in a standard query language (SQL) database.

While using the SQL queries 341 can significantly increase the maintainability of the code associated with the crypto module or NSS module 320, the use of SQL queries 341 can increase the size of the potential user base that would be more likely to be compliant with SQL than with a proprietary solution. However, it should be noted that in addition to availing the provider of the crypto module and related modules of a broader user base, the use of SQL for the organization of cryptographic objects can also be improved over that which is typically used in such database operations. FIG. 4A shows a typical manner of organizing objects, such as PKCS #11 objects, in, for example, a SQL database. As can be seen, cryptographic objects, such as PKCS#11 objects OBJECT1 410, OBJECT2 420 and OBJECT3 430 would generally be stored in a SQL data base as discrete objects, for example by object name. Attributes associated with the objects, such as <atttribute1> 411, <atttribute2> 412, <atttribute3> 413, <atttribute7> 414 and <atttribute10> 415 associated with OBJECT1 410, <atttribute3> 421, <atttribute5> 422 and <atttribute7> 423 associated with OBJECT1 420 and <atttribute10> 431 associated with OBJECT1 430, would be stored in connection with the object, for example, as an ordered or finite list. Such as list provides more cumbersome searching as is shown in FIG. 4B. Thus, a SQL query 440 can be constructed to search for objects with a value associated with, for example, <attribute3>. The SQL query 440 can be executed by examining each stored object PKCS #11 object such as OBJECT1 410, OBJECT2 420 and OBJECT3 430 and any other objects in search passes 441, 442, and 443 respectively. If the objects contain entries for <attribute3> the passes will include further passes into the objects to find the attributes such as at 444 and 445. It will be appreciated that the attribute can be a variable or fixed value, thus the search can be constructed, for example, for objects having an <attribute3> or having a specific value for <attribute3>. In either case, in accordance with more conventional organizational schemes, each object must be independently examined.

If new attributes are added to the standard, are added as part of a new standard, or are defined by a user, and existing objects possess the attribute, then the related object entries across the entire database must be edited and reorganized.

Figure 5:
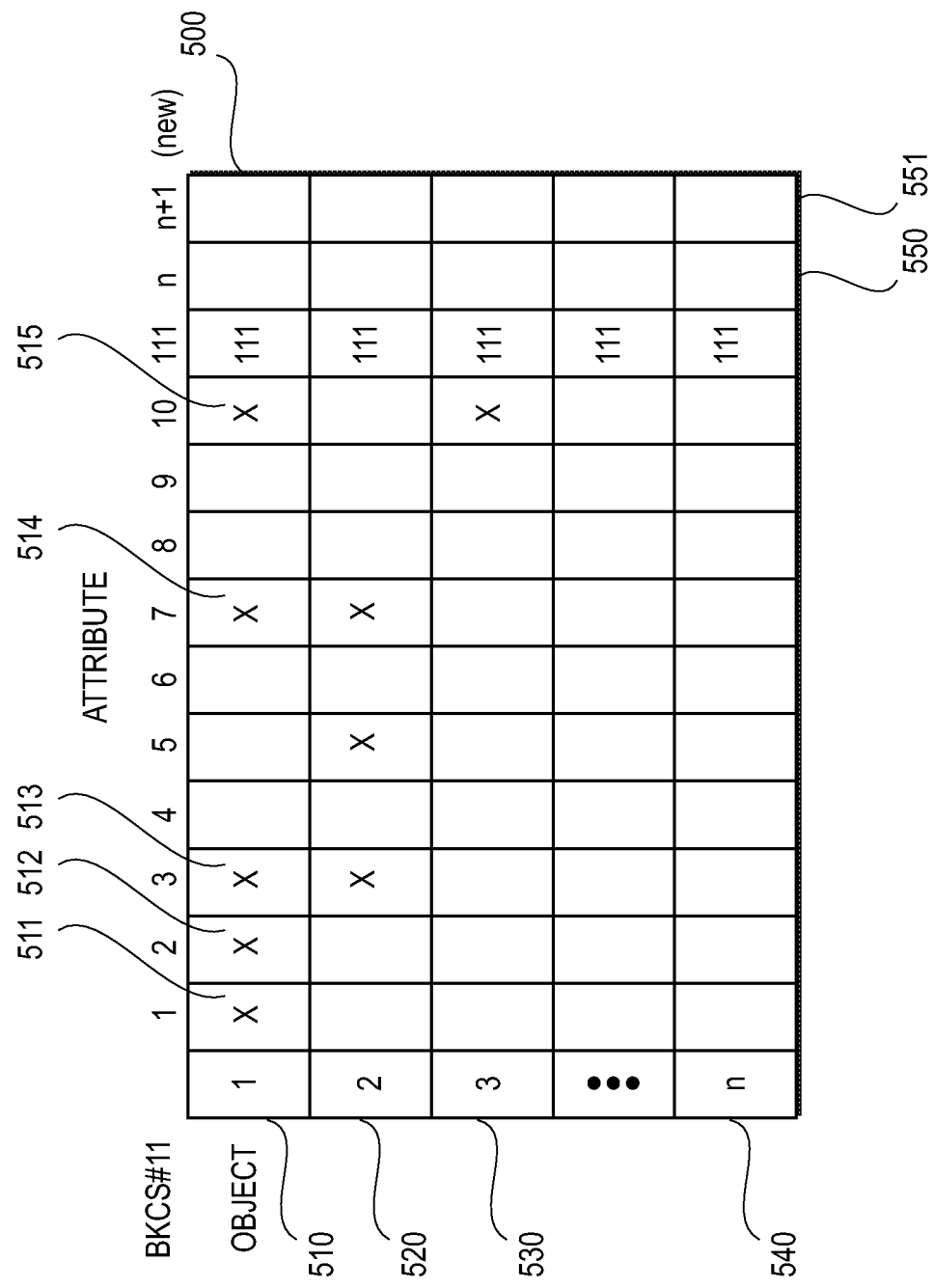
FIG. 5 is a diagram illustrating the organization of cryptographic objects stored in a storage table according to a standard query language (SQL) database consistent with embodiments of the present invention.

In accordance with various exemplary embodiments however an advantageous organization can be adopted for storing cryptographic objects in a sparse storage table 500 as shown in FIG. 5. It can be seen that cryptographic objects OBJECT1 510, OBJECT2 520, OBJECT3 530 and OBJECTN 540, which in the present embodiment are PKCS#11 objects, can be stored as rows in storage table 500. Further, attributes, such as PKCS#11 attributes and user-defined attributes can be stored as entries in a series of columns allocated for every possible one of available attributes capable of being associated with the objects. It will be appreciated that not all the attributes for any given object will be present, but a column for the attribute will be. It can be seen for example, that for OBJECT1 510, an <atttribute1> 511, an <atttribute2> 512, an <atttribute3> 513, an <atttribute7> 514 and an <atttribute10> 515 are present. For OBJECT2 520, an <atttribute3> 521, an <atttribute5> 522 and an <atttribute7> 523 are present. For OBJECT3 530, an <attribute10> 531 is present. It would be possible for an object to be present with no attributes such as OBJECTN 540. Since the storage table 500 is configured to support user defined attributes, it will be advantageous for storage table 500 to be extensible such that additional attributes that arise in connection with a user definition or that arise as a result of a modified or new cryptographic standard, can be added to the storage table without the need for re-organizing existing information in the table. If a new attribute is arises in connection with any of the above described circumstances or other circumstances, one or more new columns such as column n 550 or column n+1 551 can be added to storage table 500 without disrupting the existing organization of the table. Another clear advantage is that, since the new attribute will most likely be applicable to all the objects, a placeholder for the new attribute will be available to each object by way of the addition of the new column or columns 550 and 551. Further advantages include the ability to rapidly search the storage table 500 for cryptographic objects having particular attributes or attribute values.

Figure 6:
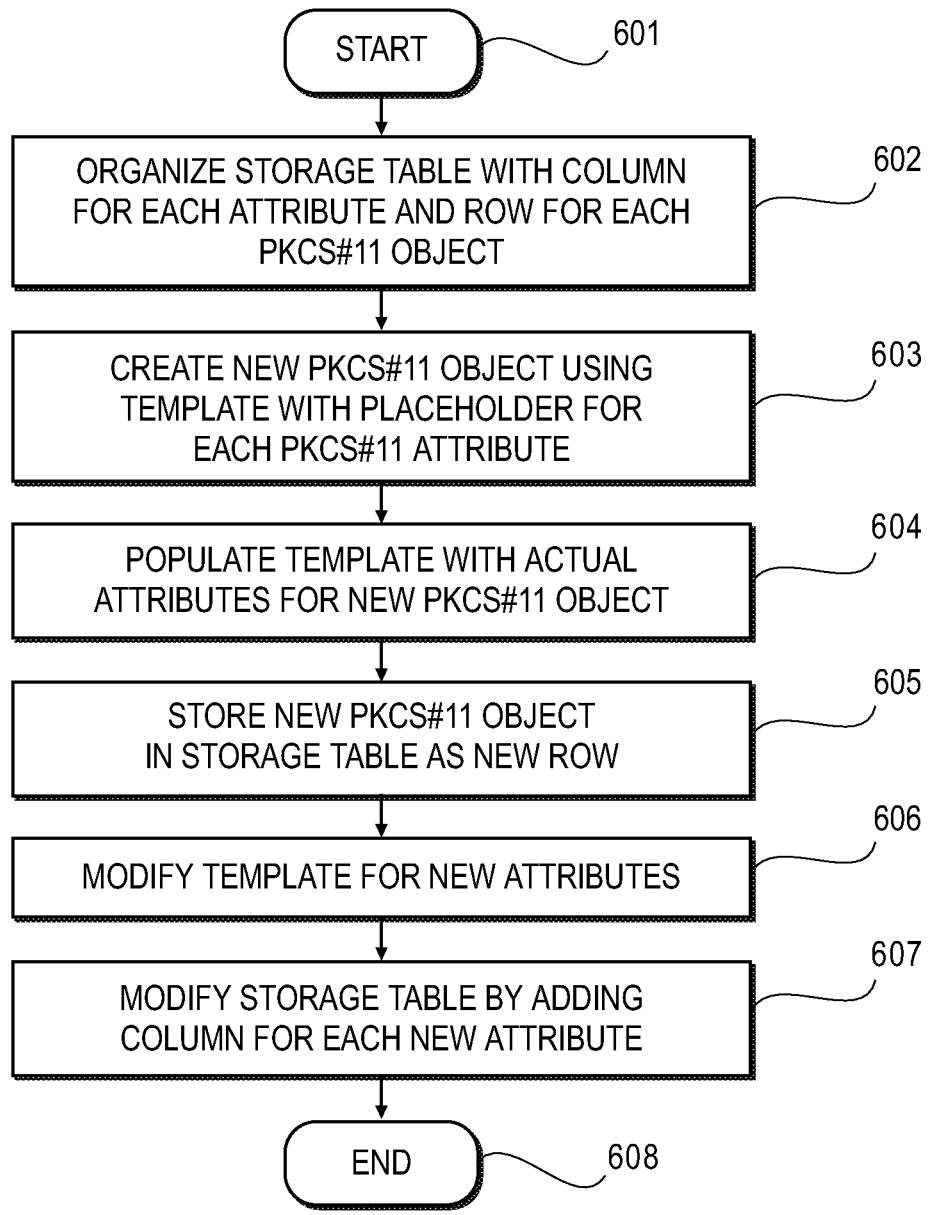
FIG. 6 is a flow chart illustrating an exemplary procedure for, inter alia, organizing a storage table with columns corresponding to attributes in accordance with the present invention.

In accordance with various embodiments, an exemplary procedure for organizing a storage table is shown in FIG. 6. After start at 601, the storage table can be created, such as by using a SQL command associated with the creation of a table, and organized such that each object, such as each PKCS#11 cryptographic object, is assigned a row, and each available attribute is assigned a column at 602. In the resulting table, each object will be provided with a column placeholder for each attribute whether or not the attribute is available for a particular object. A new cryptographic object such as a new PKCS#11 object can be created, for example, by using a template at 602. The template for the creation of a new object can be populated at 603 by the actual attributes associated with the new object. The actual attributes can be placed in the corresponding one of the available attribute columns. The new object can then be stored at 604 in the storage table, for example, as a new row. It will be appreciated that the template can be established to represent the "standard" or current object data structure and can be modified periodically at 605 to contain the present set of attributes and updated when new attributes are created by some mechanism, such as by modifying the standard, by creating a new standard, or by adding a new user-defined attribute. The storage table can be modified to accommodate the new attribute by adding a new column at 606 for each new attribute as described herein. Accordingly, a minimal amount of modification, such as to the template and to the storage table is required to accommodate extensibility. While the exemplary procedure is indicated as ending at 607, it will be appreciated that the procedure can be invoked, for example, any time new attributes or objects are added to the storage table.

Figure 7:
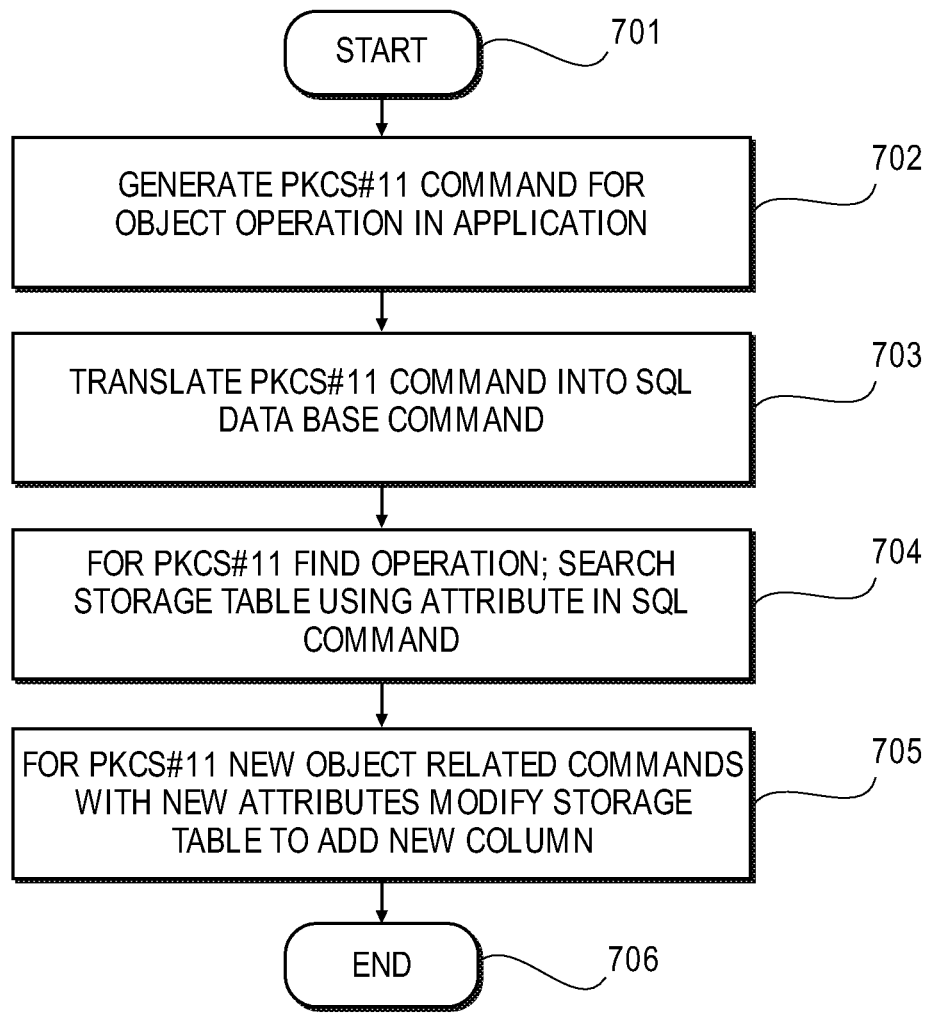
FIG. 7 is a flow chart illustrating an exemplary procedure for, inter alia, translating public key cryptography standard (PKCS) #11 commands into SQL commands in accordance with the present invention.

Another exemplary procedure for performing cryptographic operations, such as retrieving information from a storage table organized, for example, in accordance with the exemplary procedure described in connection with FIG. 6, is shown in FIG. 7. After start at 701, a command such as a PKCS#11 command can be generated in connection with a cryptographic operation on a cryptographic object at 702. The command can be generated, for example, in connection with the execution and operation of an application that requires the use of cryptographic objects such as a cryptographic application, a web browser, an email client or the like. The PKCS#11 command can be translated, for example in a cryptographic module into a SQL database command, such as a SQLite command, at 703. If the command, for example, is a find or search related command, the storage table can be searched using one or more of the available attributes to index into the storage table to perform the search by including the attribute in constructing the SQL command at 704. For commands that are associated with the creation of a new object or modification of an existing object, that require new attributes, the storage table can be modified to add a new column or columns at 705. While the exemplary procedure is indicated as ending at 706, it will be appreciated that the procedure can be invoked, for example, any time new cryptographic operations are required to be performed in connection with the storage table.

Figure 8:
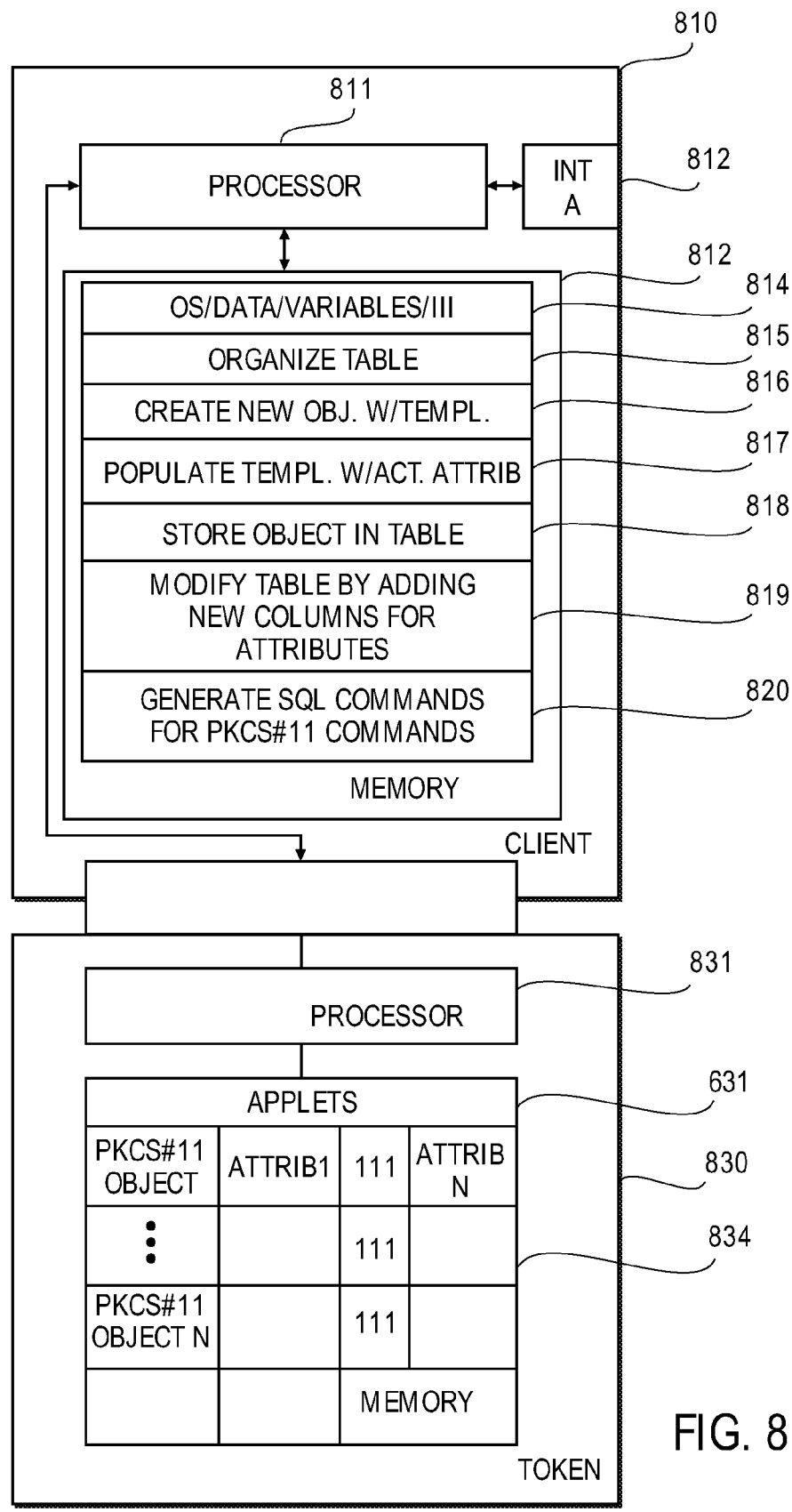
FIG. 8 is a block diagram illustrating portions of an exemplary client and token in accordance with the present invention.

In some embodiments, the exemplary procedures described herein can be implemented in an apparatus as shown in FIG. 8, which can be an exemplary computer such as a client 810 having a processor 811 configured to execute computer instructions stored in memory 813, or other computer readable medium, causing all or various portions of the procedure to be carried out. The client 810 can also be configured with an interface 812, which, when operating in connection with the processor 810 can be used to facilitate a network or intranet connection and exchange and transfer of information associated with a computer system and an external repository of encrypted content such as an email server. The apparatus can also include a token such as a security token 830, which can be a smart card, a universal serial bus (USB) token or any other type of token. The token 830 can optionally include a processor 831 for executing small, compact applications or applets, for example that could be used to support storage and retrieval functions associated with a memory area 832. Applets can be stored, for example in the memory area at 833 and the storage table for storing cryptographic objects, such as PKCS#11 objects can be stored at 834.

The memory 813 can store the usual information such as operating system software, data, variables, and applications, including application code associated with the exemplary procedures described herein, at 815. A token access application program interface (API) can also be stored at 814 such that calls to the token to retrieve information can be made. As described above, the storage table for storing cryptographic objects in the token 830 can be organized at 815. If a new object is encountered, a template for new object creation can be used to create a new object for storage in the storage table at 816. The template can be populated with actual attributes at 817. The object can then be stored in the table at 818. The table can be modified at 819, for example, in response to the creation of new attributes, or an object with new attributes, by adding a new column or columns corresponding to the new attribute or attributes. SQL commands corresponding to PKCS#11 commands can be generated at 820 along with the relevant attributes and passed to the token 830 to retrieve objects or perform other cryptographic operations in association with the objects, for example as described herein.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
    generating, by a processor, a single storage table for cryptographic objects, wherein the single storage table comprises rows corresponding to the cryptographic objects and columns corresponding to available attributes capable of being associated with any of the cryptographic objects, wherein the cryptographic objects are defined by a plurality of different cryptographic standards;
    storing actual attributes of the cryptographic objects in at least one of the columns that correspond to the associated available attributes,
    receiving a new cryptographic object;
    determining that the new cryptographic object is defined by a cryptographic standard not represented in the single storage table and comprises a new attribute of the new cryptographic standard that does not have a corresponding column in the single storage table; and
    storing, in view of the determining, the new cryptographic object in the single storage table by:
        adding a new column to the single storage table that corresponds to the new attribute of the new cryptographic object; and
        storing a null value in the rows associated with the new column corresponding to the cryptographic objects currently stored in the single storage table.

2. The method of claim 1, further comprising searching the single storage table for one or more of the cryptographic objects in view of one or more of the available attributes.

3. The method of claim 1, further comprising:
    searching the single storage table for one or more of the cryptographic objects in view of one or more of the available attributes; and
    locating a matching cryptographic object from the cryptographic objects having actual attributes corresponding to the one or more of the available attributes used in the searching.

4. The method of claim 1, wherein the available attributes comprise at least one of attribute value pairs or user-defined attributes.

5. The method of claim 1, wherein the single storage table comprises a standard query language (SQL) database table.

6. The method of claim 1, wherein the available attributes are defined in accordance with a PKCS #11 standard.

7. The method of claim 1, wherein the available attributes comprise a pathname of the cryptographic objects.

8. The method of claim 1, wherein the available attributes comprise a provider name of the cryptographic objects.

9. The method of claim 1, wherein the available attributes comprise a method of a provider of the cryptographic objects.

10. The method of claim 1, wherein the available attributes comprise an enabled method of a provider of the cryptographic objects.

11. The method of claim 1, wherein the available attributes comprise a disabled method of a provider of the cryptographic objects.

12. A non-transitory computer readable medium comprising instructions for causing a processing device to perform operations comprising:
    maintaining, by a cryptography module executed by the processing device, a single storage table capable of storing cryptographic objects each having at least a portion of available attributes, wherein the single storage table is accessible using a standard query language (SQL), and wherein the single storage table is organized such that a row is allocated to the each of the cryptographic objects and a column is allocated to each of the available attributes, and wherein the cryptographic objects are defined by a plurality of different cryptographic standards;
    determining that a new cryptographic object to be added to the single storage table is defined by a cryptographic standard not represented in the single storage table and comprises a new attribute of the new cryptographic standard that does not have a corresponding column in the single storage table;
    storing, in view of the determining, the new cryptographic object in the single storage table by:
        adding a new column to the single storage table that corresponds to a new attribute of a new cryptographic object that is associated with a cryptographic standard not yet represented in the single storage table; and
        storing a null value in each row associated with the new column corresponding to the cryptographic objects currently stored in single storage table;
    receiving, by the cryptography module from an application using a security library, a request in accordance with one of the cryptography standards, the request for one of the cryptographic objects and comprising a first command; and
    translating the first command associated with the requested cryptographic object, the first command constructed in accordance with the one of the cryptography standards, into a second command constructed in accordance with the SQL, wherein at least one of the first or the second command is constructed using at least one of the available attributes.

13. The non-transitory computer readable medium of claim 12, wherein the first command comprises one of a CREATE_OBJECT command, a COPY OBJECT command, a DELETE OBJECT command, a FIND OBJECT command, a GET_ATTRIBVALUE command, and a SET_ATTRIBUTE_VALUE command.

14. The non-transitory computer readable medium of claim 12, wherein the cryptographic module is compliant with a government standard comprising a federal information processing standard (FIPS).

15. The non-transitory computer readable medium of claim 12, wherein the cryptographic objects comprise public key cryptography standard (PKCS) #11 objects.

16. The non-transitory computer readable medium of claim 12, wherein the operations further comprise:
    adding an additional new column to the single storage table corresponding to an additional new attribute associated with the cryptographic objects.

17. The non-transitory computer readable medium of claim 12, wherein the application comprises at least one of a web browser, a cryptography application, or an email client.

18. The non-transitory computer readable medium of claim 12, wherein the single storage table is maintained on a token.

19. A system comprising:
a token interface; and
a processor coupled to the token interface, the processor to:
organize a single storage table for storage in a token coupled to the token interface, wherein the single storage table stores cryptographic objects each having at least a portion of a set of available attributes associated with a cryptographic standard of a plurality of cryptographic standard represented in the single storage table, wherein the single storage table is accessible using a standard query language (SQL), and wherein the single storage table is organized such that a row is allocated to each of the cryptographic objects and a column is allocated to each of the available attributes;
determine that a new cryptographic object to be added to the single storage table is defined by a cryptographic standard not represented in the single storage table and comprises a new attribute of the new cryptographic standard that does not have a corresponding column in the single storage table;
store, in view of the determining, the new cryptographic object in the single storage table by:
adding a new column to the single storage table that corresponds to a new attribute of a new cryptographic object that is associated with a cryptographic standard not yet represented in the single storage table; and
storing a null value in each row associated with the new column corresponding to the cryptographic objects currently stored in single storage table;
receive, by the cryptography module from an application using a security library, a request for one of the cryptographic objects in accordance with one of the plurality of cryptography standards; and
translate the request from the security library for the one of the cryptographic objects to a SQL request for the one of the cryptographic objects using at least one of the portion of the set of available attributes.

20. The system of claim 19, wherein the new attribute is associated with at least one of a revised version of the cryptographic standard, a new cryptographic standard, or a user-defined attribute.

21. The system of claim 19, wherein the available attributes comprise at least one of attribute value pairs, user-defined attributes, a pathname of the cryptographic objects, a provider name of the cryptographic objects, a method of a provider of the cryptographic objects, an enabled method of a provider of the cryptographic objects, or a disabled method of a provider of the cryptographic objects.

22. The system of claim 19, wherein the available attributes are defined in accordance with a PKCS #11 standard.

* * * * *